(12) United States Patent  (10) Patent No.: US 7,729,831 B2
Pillar et al.  (45) Date of Patent: Jun. 1, 2010

(54) CONCRETE PLACEMENT VEHICLE CONTROL SYSTEM AND METHOD

(75) Inventors: Duane R. Pillar, Oshkosh, WI (US); William M. Woolman, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1658 days.

(21) Appl. No.: 10/903,450

(22) Filed: Jul. 30, 2004

(65) Prior Publication Data

US 2005/0004733 A1  Jan. 6, 2005

Related U.S. Application Data

(63) Continuation-in-part of application No. 09/927,946, filed on Aug. 10, 2001, now Pat. No. 7,024,296, which is a continuation-in-part of application No. 09/384,393, filed on Aug. 27, 1999, now Pat. No. 6,421,593, which is a continuation-in-part of application No. 09/364,690, filed on Jul. 30, 1999, now abandoned, application No. 10/903,450, which is a continuation-in-part of application No. 10/326,862, filed on Dec. 19, 2002, now Pat. No. 6,885,920.

(60) Provisional application No. 60/491,411, filed on Jul. 31, 2003, provisional application No. 60/342,292, filed on Dec. 21, 2001.

(51) Int. Cl.
*B28C 7/02* (2006.01)

(52) U.S. Cl. .......................................... 701/48; 417/34

(58) Field of Classification Search ................... 701/48; 123/352; 417/34; 366/27, 34, 43, 44, 53–61, 366/220–225, 601
See application file for complete search history.

(56) References Cited

U.S. PATENT DOCUMENTS

| | | | |
|---|---|---|---|
| 1,951,089 A | | 3/1934 | Fielder |
| 3,059,716 A | * | 10/1962 | Iserman et. al. ............. 180/275 |
| 3,160,398 A | * | 12/1964 | Green .......................... 366/61 |
| 3,496,343 A | * | 2/1970 | Johanson ...................... 377/15 |
| 3,524,069 A | | 8/1970 | Stepanov et al. |
| 3,690,559 A | | 9/1972 | Rudloff |

(Continued)

FOREIGN PATENT DOCUMENTS

DE    40 41 483 A1    6/1992

(Continued)

OTHER PUBLICATIONS

Instruction and Parts Manual, Machine type: GCB 1000 SPLIT, May 23, 2002, 80 pages, Geesink Norba Group.

(Continued)

*Primary Examiner*—Dalena Tran
(74) *Attorney, Agent, or Firm*—Foley & Lardner LLP (57) ABSTRACT

A concrete placement vehicle. The concrete placement vehicle includes a concrete mixing and placement system, at least one vehicle sensor configured to monitor a characteristic of the concrete placement vehicle and at least one concrete system sensor configured to monitor a characteristic of the system for mixing and placing concrete. The vehicle further includes a control system configured to control the operation of the concrete placement vehicle and the concrete mixing and placement system based on inputs received from the at least one vehicle sensor and the at least one concrete system sensor.

13 Claims, 5 Drawing Sheets

U.S. PATENT DOCUMENTS

| | | | |
|---|---|---|---|
| 3,720,863 A | 3/1973 | Ringland et al. | |
| 3,729,106 A | 4/1973 | Barbieri | |
| 3,773,304 A * | 11/1973 | Hodgson | 366/61 |
| 3,799,284 A | 3/1974 | Hender | |
| 3,865,209 A | 2/1975 | Aihara et al. | |
| 3,966,067 A | 6/1976 | Reese | |
| 4,088,934 A | 5/1978 | D'Atre et al. | |
| 4,097,925 A * | 6/1978 | Butler, Jr. | 366/2 |
| 4,113,045 A | 9/1978 | Downing, Jr. | |
| 4,114,193 A * | 9/1978 | Hudelmaier | 366/2 |
| 4,292,531 A | 9/1981 | Williamson | |
| 4,319,140 A | 3/1982 | Paschke | |
| 4,336,418 A | 6/1982 | Hoag | |
| 4,423,794 A | 1/1984 | Beck | |
| 4,444,285 A | 4/1984 | Stewart et al. | |
| 4,453,880 A | 6/1984 | Leisse | |
| 4,461,988 A | 7/1984 | Plunkett | |
| 4,562,894 A | 1/1986 | Yang | |
| 4,760,275 A | 7/1988 | Sato et al. | |
| 4,774,399 A | 9/1988 | Fujita et al. | |
| 4,774,811 A | 10/1988 | Kawamura | |
| 4,809,177 A | 2/1989 | Windle et al. | |
| 4,839,571 A * | 6/1989 | Farnham et al. | 340/606 |
| 4,846,581 A * | 7/1989 | Osterlund et al. | 366/61 |
| 4,953,646 A | 9/1990 | Kim | |
| 4,966,242 A | 10/1990 | Baillargeon | |
| 4,985,845 A | 1/1991 | Gotz et al. | |
| 5,062,759 A | 11/1991 | Pieperhoff | |
| 5,067,932 A | 11/1991 | Edwards | |
| 5,071,307 A | 12/1991 | Carson | |
| 5,081,832 A | 1/1992 | Mowill | |
| 5,120,282 A | 6/1992 | Fjallstrom | |
| 5,215,423 A | 6/1993 | Schulte-Hinsken et al. | |
| 5,222,853 A | 6/1993 | Carson | |
| 5,343,675 A | 9/1994 | Norton | |
| 5,418,437 A | 5/1995 | Couture et al. | |
| 5,470,187 A | 11/1995 | Smith et al. | |
| 5,508,689 A | 4/1996 | Rado et al. | |
| 5,540,037 A | 7/1996 | Lamb et al. | |
| 5,568,023 A | 10/1996 | Grayer et al. | |
| 5,601,392 A | 2/1997 | Smith et al. | |
| 5,637,933 A | 6/1997 | Rawlings et al. | |
| 5,752,768 A * | 5/1998 | Assh | 366/3 |
| 5,851,100 A | 12/1998 | Brandt | |
| 5,856,976 A | 1/1999 | Hirano | |
| 5,890,865 A | 4/1999 | Smith et al. | |
| 5,954,470 A | 9/1999 | Duell et al. | |
| 5,957,985 A | 9/1999 | Wong et al. | |
| 6,012,004 A | 1/2000 | Sugano et al. | |
| 6,038,500 A | 3/2000 | Weiss | |
| 6,065,565 A | 5/2000 | Puszkiewicz et al. | |
| 6,070,538 A | 6/2000 | Flamme et al. | |
| 6,123,497 A | 9/2000 | Duell et al. | |
| 6,152,673 A | 11/2000 | Anderson et al. | |
| 6,230,496 B1 | 5/2001 | Hofmann et al. | |
| 6,263,269 B1 | 7/2001 | Dannenberg | |
| 6,269,295 B1 | 7/2001 | Gaugush et al. | |
| 6,331,365 B1 | 12/2001 | King | |
| 6,332,745 B1 | 12/2001 | Duell et al. | |
| 6,405,114 B1 | 6/2002 | Priestley et al. | |
| 6,421,593 B1 | 7/2002 | Kempen et al. | |
| 6,429,773 B1 * | 8/2002 | Schuyler | 340/425.5 |
| 6,430,164 B1 | 8/2002 | Jones et al. | |
| 6,501,368 B1 | 12/2002 | Wiebe et al. | |
| 6,522,955 B1 | 2/2003 | Colborn | |
| 6,553,290 B1 | 4/2003 | Pillar | |
| 6,580,953 B1 | 6/2003 | Wiebe et al. | |
| 6,611,755 B1 | 8/2003 | Coffee et al. | |
| 6,757,597 B2 | 6/2004 | Yakes et al. | |
| 6,882,917 B2 | 4/2005 | Pillar et al. | |
| 6,885,920 B2 | 4/2005 | Yakes et al. | |
| 6,922,615 B2 | 7/2005 | Pillar et al. | |
| 6,993,421 B2 | 1/2006 | Pillar et al. | |
| 2002/0065594 A1 | 5/2002 | Squires et al. | |
| 2002/0101568 A1 | 8/2002 | Eberl et al. | |
| 2003/0031543 A1 | 2/2003 | Elbrink | |
| 2003/0114965 A1 | 6/2003 | Fiechter et al. | |
| 2003/0130765 A1 | 7/2003 | Pillar et al. | |
| 2003/0158635 A1 | 8/2003 | Pillar et al. | |
| 2003/0163228 A1 | 8/2003 | Pillar et al. | |
| 2003/0163230 A1 | 8/2003 | Pillar et al. | |
| 2003/0171854 A1 | 9/2003 | Pillar et al. | |
| 2003/0195680 A1 | 10/2003 | Pillar | |
| 2003/0200015 A1 | 10/2003 | Pillar | |
| 2003/0205422 A1 | 11/2003 | Morrow et al. | |
| 2004/0019414 A1 | 1/2004 | Pillar et al. | |
| 2004/0024502 A1 | 2/2004 | Squires et al. | |
| 2004/0039510 A1 | 2/2004 | Archer et al. | |
| 2004/0055802 A1 | 3/2004 | Pillar et al. | |
| 2004/0069865 A1 | 4/2004 | Rowe et al. | |
| 2004/0133319 A1 | 7/2004 | Pillar et al. | |
| 2004/0133332 A1 | 7/2004 | Yakes et al. | |
| 2004/0199302 A1 | 10/2004 | Pillar et al. | |
| 2005/0038934 A1 | 2/2005 | Gotze et al. | |
| 2005/0113988 A1 | 5/2005 | Nasr et al. | |
| 2005/0113996 A1 | 5/2005 | Pillar et al. | |
| 2005/0114007 A1 | 5/2005 | Pillar et al. | |
| 2005/0119806 A1 | 6/2005 | Nasr et al. | |
| 2005/0131600 A1 | 6/2005 | Quigley et al. | |

FOREIGN PATENT DOCUMENTS

| | | |
|---|---|---|
| DE | 101 03 922 A1 | 1/2001 |
| EP | 0 496 302 B1 | 7/1992 |
| EP | 0 564 943 B1 | 10/1993 |
| EP | 0 630 831 A1 | 12/1994 |
| EP | 0 791 506 A2 | 8/1997 |
| EP | 0 894 739 A1 | 2/1999 |
| JP | 60-008132 A | 1/1985 |
| WO | WO 96/32346 A1 | 10/1996 |
| WO | WO 96/40573 A1 | 12/1996 |
| WO | WO 2004/052756 A1 | 6/2004 |
| WO | WO 2005/030614 A1 | 4/2005 |

OTHER PUBLICATIONS

Instruction and Parts Manual, Machine type: GPM lle, Jul. 10, 2002, 74 pages, Geesink Norba Group.

Instruction Manual for the Training AS-i bus, Aug. 2002, 31 pages, Version 3.0, Geesink Norba Group.

\* cited by examiner

CONCRETE PLACEMENT VEHICLE CONTROL SYSTEM AND METHOD

CROSS-REFERENCE TO RELATED PATENT APPLICATIONS

This application is a continuation-in-part of U.S. Ser. No. 09/927,946, filed Aug. 10, 2001, pending, which is a continuation-in-part of U.S. Ser. No. 09/384,393, filed Aug. 27, 1999, now U.S. Pat. No. 6,421,593, which is a continuation-in-part of U.S. Ser. No. 09/364,690, filed Jul. 30, 1999, abandoned, each of which is hereby expressly incorporated by reference. This application also claims priority to U.S. patent application. Ser. No. 10/326,862, filed Dec. 19, 2002, which claims priority to U.S. Prov. No. 60/342,292, filed Dec. 21, 2001, each of which is also hereby expressly incorporated by reference. This application further claims priority to U.S. Prov. No. 60/491,411, filed Jul. 31, 2003, which is hereby expressly incorporated by reference.

BACKGROUND OF THE INVENTION

The present invention relates generally to the field of concrete placement vehicles. More specifically, the present invention relates to concrete placement vehicle control systems for concrete placement vehicles.

Various vehicles, vehicle types and configurations of vehicles are known for use in placement of concrete. Concrete placement vehicles often include a mixing drum rotatably mounted to a flatbed of an industrial vehicle. The mixing drum includes mixing blades affixed to the interior of the drum in a spiral pattern to either charge (mix) or discharge concrete. A delivery system usually includes a chute or pumping hose placed at an opening in the mixing drum. Rotation of the drum for both mixing and discharging operations is controlled by a mixing drum motor mounted to the flatbed of the vehicle and connected to the mixing drum.

In operation, concrete materials are added to the mixing drum to initiate a concrete mixing process. Concrete materials can include at least cement, sand, aggregate, and water. Following addition of materials, the mixing drum is rotated in a first direction by the mixing drum motor to mix the materials and produce concrete. The rotation of the mixing drum in a direction to mix the materials therein is referred to as a charging rotation.

During delivery, concrete is removed from the drum through a mechanical or forced pressure system for delivery. Using a mechanical system, the mixing drum is rotated in a second direction, referred to as a discharging rotation. The concrete can be delivered from the mixing drum to a concrete delivery chute extending outward from an opening in the drum to the point where the concrete is to be placed. Alternatively, the opening in the mixing drum can be connected to a hose, the outlet of which is placed at the point where concrete is to be delivered.

All aspects of the above-described operations related to a concrete mixing and delivery system may be controlled by a human operator. The human operator places the concrete materials in the mixing drum, controls the mixing drum motor to rotate the mixing drum to mix the concrete mixing materials, and controls the concrete delivery system to deliver the concrete.

In some instances, the human operator is not able to continuously and effectively control and monitor the concrete mixing and delivery system while performing operations associated with the mixing and delivery process. For example, during concrete discharging, the operator may control the chute or hose outlet from a control panel locate on the vehicle to ensure the proper placement of the concrete load. The operator must also control the rotation speed of the mixing drum to control the flow of the concrete. However, the drum rotation controls and the delivery system controls may be in separate locations making it difficult for the operator to easily control both systems.

Further, the operation of the mixing drum motor can be dependent, at least in part, on the engine speed of a concrete placement vehicle. For example, at high mixing drum rotation speeds, the RPM of the engine for the concrete placement vehicle must be sufficiently high to power the mixing drum motor. Accordingly, in order to increase the mixing drum rotation speed, an operator is required to first increase the engine RPM of the concrete placement vehicle and then increase the rotation speed of the concrete mixing drum. Such an operation causes a loss in efficiency.

Yet further, while driving concrete from an origin point to a delivery site, the operator is generally not able to monitor and control the state of the concrete in the mixing drum. The concrete may become too dry or separate during the time the operator is driving to the delivery site. Accordingly, the operator is forced to take remedial action upon arriving at the delivery site to correct any problems that may have occurred during the drive from the origin site to the delivery point causing a loss in efficiency.

Accordingly, it is desirable to provide a control system for a concrete placement vehicle which overcomes one or more of the above-mentioned problems. Advantageously, such a control system would enhance many aspects of concrete placement. The techniques below extend to those embodiments which fall within the scope of the appended claims, regardless of whether they provide any of the above-mentioned advantageous features.

SUMMARY OF THE INVENTION

One embodiment of the invention relates to a concrete placement vehicle. The concrete placement vehicle includes a concrete mixing and placement system, at least one vehicle sensor configured to monitor a characteristic of the concrete placement vehicle and at least one concrete system sensor configured to monitor a characteristic of the system for mixing and placing concrete. The vehicle further includes a control system configured to control the operation of the concrete placement vehicle and the concrete mixing and placement system based on inputs received from the at least one vehicle sensor and the at least one concrete system sensor.

Another embodiment of the invention relates to a concrete placement system. The concrete placement system comprises a plurality of components for mixing and placing concrete including at least a first component and a second component, each component including an operational state. The system further includes a control system configured to determine the operational state of a first component and to control the first component based on an operational state of the second component.

Another embodiment of the invention relates to a concrete placement vehicle. The concrete placement vehicle comprises a concrete mixing and placement system comprises a mixing motor mounted to the concrete placement vehicle and configured to rotate a concrete mixing drum, a concrete delivery chute configured to be controlled by at least one actuator, and a power distribution and control system. The power distribution and control system further includes a power source, a power transmission link, a plurality of output devices and a plurality of input devices. The plurality of output devices includes a plurality of actuators capable of adjusting the position of the concrete delivery chute. The plurality of input devices includes a plurality of position indicators capable of providing position information pertaining to the position of the concrete delivery chute. The system further includes a communication network, and a plurality of microprocessor-based interface modules. The plurality of interface modules may be coupled to the power source by way of the power transmission link and interconnected to each other by way of the communication network. The plurality of interface modules may also be coupled to the plurality of input devices and to the plurality of output devices by way of respective dedicated communications links. The plurality of interface modules include an interface module that is coupled to at least some of the plurality of position sensors and at least some of the plurality of actuators, wherein the plurality of interface modules, the plurality of input devices, and the plurality of output devices are distributed throughout the concrete placement vehicle. Further, each respective interface module is locally disposed with respect to the respective input and output devices to which the respective interface module is coupled so as to permit distributed data collection from the plurality of input devices and distributed power distribution to the plurality of output devices.

Another embodiment of the invention relates to a method of controlling a concrete placement vehicle. The method comprises receiving a control signal for a first component of a system for mixing and placing concrete, determining an operational state of at least one additional component of the system for mixing and placing concrete, and controlling the first component of the system for mixing and placing concrete based on the control signal and the operational state of at least one additional component.

DETAILED DESCRIPTION OF THE PREFERRED EMBODIMENTS

Figure 1:
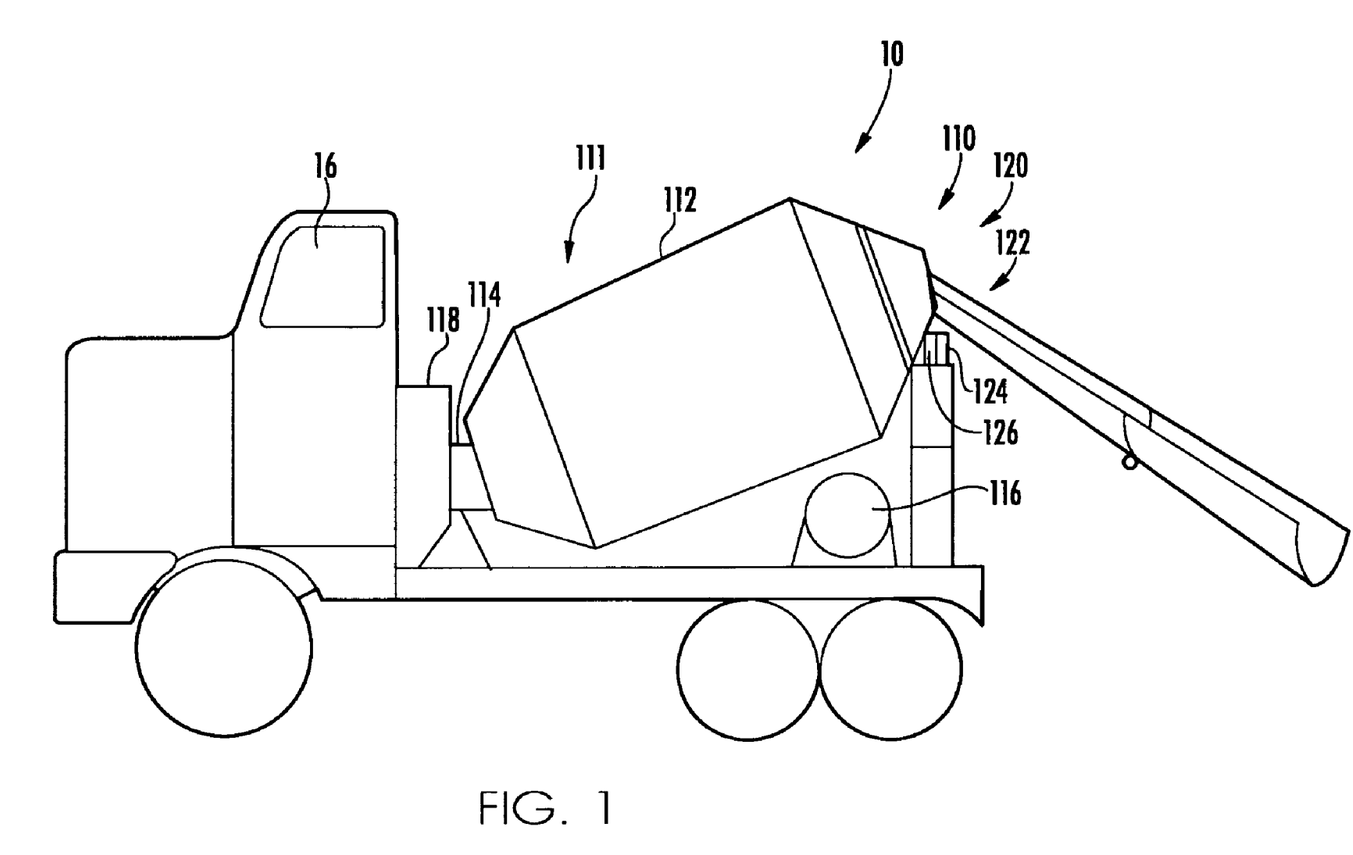
FIG. 1 is a perspective view of a concrete placement vehicle having a control system according to one embodiment of the present invention.

Referring to FIG. 1, an exemplary embodiment of a concrete placement vehicle 10 is illustrated. By way of overview, the concrete placement vehicle 10 generally includes a chassis, an engine, and a vehicle body mounted on the chassis, with the chassis and the vehicle body in combination including an operator compartment 16 capable of receiving a human operator. The operator compartment 16 further includes steering and throttle controls for receiving operator inputs to control the movement of the concrete placement vehicle 10 along a road. A concrete placement system 110 may be mounted to the concrete placement vehicle 10, and can be configured to transport and deliver a load of concrete. Delivery of a concrete load includes discharging the concrete load from the concrete placement system 110.

It should be understood that FIG. 1 merely illustrates one embodiment, and that the concrete placement vehicle 10 may have a variety of configurations. For example, in FIG. 1, the concrete placement vehicle 10 includes a rear discharging concrete placement system; however, it should be understood that the applicability of the present disclosure is not limited to rear discharging concrete placement systems. Rather, other types of concrete placement systems may be used such as front discharging systems, concrete pumping delivery systems, etc. The teachings herein do not depend on the configuration, construction, size, or assembly of the concrete placement vehicle 10.

The concrete placement system 110 may include a concrete mixing system 111 and a concrete delivery system 120. Concrete mixing system 111 can include a concrete mixing drum 112, a mixing motor 114, a water storage system 116, and a cooling system 118. Concrete delivery system 120 can include a concrete delivery chute 122, a delivery chute rotation motor 124 and a delivery chute elevation motor 126.

Concrete mixing drum 112 can be configured according to a variety of sizes and shapes. The concrete mixing drum 112 can be sized and shaped based on a variety of factors such as the strength of the chassis of concrete placement vehicle 10, local regulations and weight requirements, average concrete load size, or any other factors. Concrete mixing drum 112 typically includes a set of mixing blades placed within the interior of concrete mixing drum 112 (not shown). The concrete mixing blades can be fixedly mounted to the interior walls of concrete mixing drum 112 and configured to optimize the agitation and mixing of concrete materials placed within concrete mixing drum 112. The concrete mixing blades are further mounted such that rotation of the mixing drum 112 in a first direction will mix the contents of the drum (hereinafter referred to as charging or mixing), while rotation of the mixing drum 112 in a second direction will cause the content of the drum to delivered from drum 112 through an opening in drum 112. According to an exemplary embodiment, mixing drum 112 is a McNeilus manufactured by McNeilus Companies, Inc. of Dodge Center, Minn. Exemplary mixing drums are shown in U.S. Pat. Nos. 5,056,924, 5,378,061 and 5,427,449, all of which are assigned to the assignee of the present application and are expressly incorporated herein by reference.

Mixing drum 112 further includes a drum opening configured and sized according to concrete delivery needs. For example, a larger opening may be desirable increase the speed of delivery of concrete from concrete mixing drum 112 or a smaller opening may be desirable to decrease loss of moisture content from a concrete load. Concrete mixing drum 112 is mounted to the concrete placement vehicle 10 and coupled to concrete mixing motor 114.

Concrete mixing motor 114 may be any motor type configured to rotate concrete mixing drum 112. According to an exemplary embodiment, concrete mixing motor 114 is sized and configured based upon the configuration and size of concrete mixing drum 112. According to an exemplary embodiment, mixing motor 114 is a hydraulic motor activated by a hydraulic pump (not shown). The hydraulic pump can be powered by the engine of concrete placement vehicle 10.

Concrete mixing motor 114 is mounted to the chassis of concrete placement vehicle 10 and coupled to concrete mixing drum 112. Mixing motor 114 can be coupled to concrete mixing drum 112 through a drum transmission (not shown).

According to an exemplary embodiment, concrete mixing motor 114 can rotate concrete mixing drum 112 at a variety of speeds. The speed at which concrete mixing motor 114 rotates concrete mixing drum 112 can be selected based on a variety of criteria such as the characteristics of the concrete load contained within concrete mixing drum 112, a desired rate of delivery of the concrete load through the opening in concrete mixing drum 112, the state of the concrete contained within concrete mixing drum (e.g. an unmixed state, a mixing state, a ready state, etc.) and so on.

Water storage system 116 can be any system for storing and dispensing water. According to an exemplary embodiment, water storage system 116 can be mounted to the chassis of concrete placement vehicle 10. Provision of a water storage system on concrete placement vehicle 10 allows an operator to add water to a concrete load within concrete mixing drum 112 at any time and in any location. For example, at a concrete origination site, concrete mixing drum 112 may be filled with a mixed concrete, and a water storage system may be filled with water. Concrete placement vehicle 10 may be driven to the concrete delivery site and the water may be mixed with the dry concrete materials at the site to optimize the characteristics of the concrete load. For example, if a concrete load within concrete mixing drum 112 has become too dry during transportation, water storage system 116 can be used to add additional moisture to the concrete load.

According to yet another exemplary embodiment, concrete placement system 110 can include a cooling system 118 mounted on the chassis of concrete placement vehicle 10. During mixing of a concrete load, particularly a load known as a low slump load, in which the moisture content of the concrete is relatively low, components of concrete mixing system 111 and concrete placement vehicle 10 can generate an excessive amount of heat. A cooling system included in concrete placement system 110 can be used to reduce the amount of heat generated by system 110 and/or vehicle 10. Advantageously, concrete loads having low slump characteristics can be mixed and/or delivered for more extended periods without damaging concrete placement vehicle 10 or components of concrete placement vehicle 10.

The components, subsystems, and operations described above with reference to concrete mixing system are described for illustrative purposes only. According to alternative embodiments, concrete mixing system 111 can include more, fewer, or different sub-systems or components than described above. Further, the sub-systems and components can perform more, fewer, or different functions than described above.

Referring now to concrete delivery system 120, concrete delivery chute 122 includes a first end mounted proximate to the opening in concrete mixing drum 112 and a second end that is movable to position near a concrete delivery point according to an exemplary embodiment. According to an exemplary embodiment, concrete delivery chute 122 further includes at least one hinged portion located along the length of concrete delivery chute 122 such that chute 122 can be folded during transportation, and unfolded during concrete delivery. According to an alternative embodiment, delivery chute 122 can include multiple chute sections that may be assembled during concrete placement and stored during transportation.

Concrete delivery chute 122 is mounted to concrete placement vehicle 10 at the first end proximate to the opening in concrete mixing drum 112. Concrete delivery chute 122 is rotatable on the mounting point in a semicircular arc such that the second end of the concrete delivery chute can be moved to a desired concrete delivery point. Rotation of delivery chute 122 through the semicircular arc can be controlled by the delivery chute rotation motor 124. Concrete delivery chute 122 is further movable to raise or lower the second end of delivery chute 122. Elevation of delivery chute 122 can be controlled by the delivery chute elevation motor 124. According to an alternative embodiments, the rotation and elevation control of concrete delivery chute 122 can be hydraulically driven or controlled through manual operator intervention.

As shown in FIG. 1, concrete delivery system 120 can be mounted on the rear of concrete placement vehicle 10 such that concrete is delivered from the rear of concrete placement vehicle 10. According to an alternative embodiment, the concrete delivery system 120 can be configured such that the concrete delivery system 120 is mounted to the front of concrete placement vehicle 10 such that concrete delivery chute 122 extends outward from the front of concrete placement vehicle 10. Advantageously, a front-mounted concrete delivery system 120 allows a driver to control delivery of concrete from within operator compartment 16.

Figure 2:
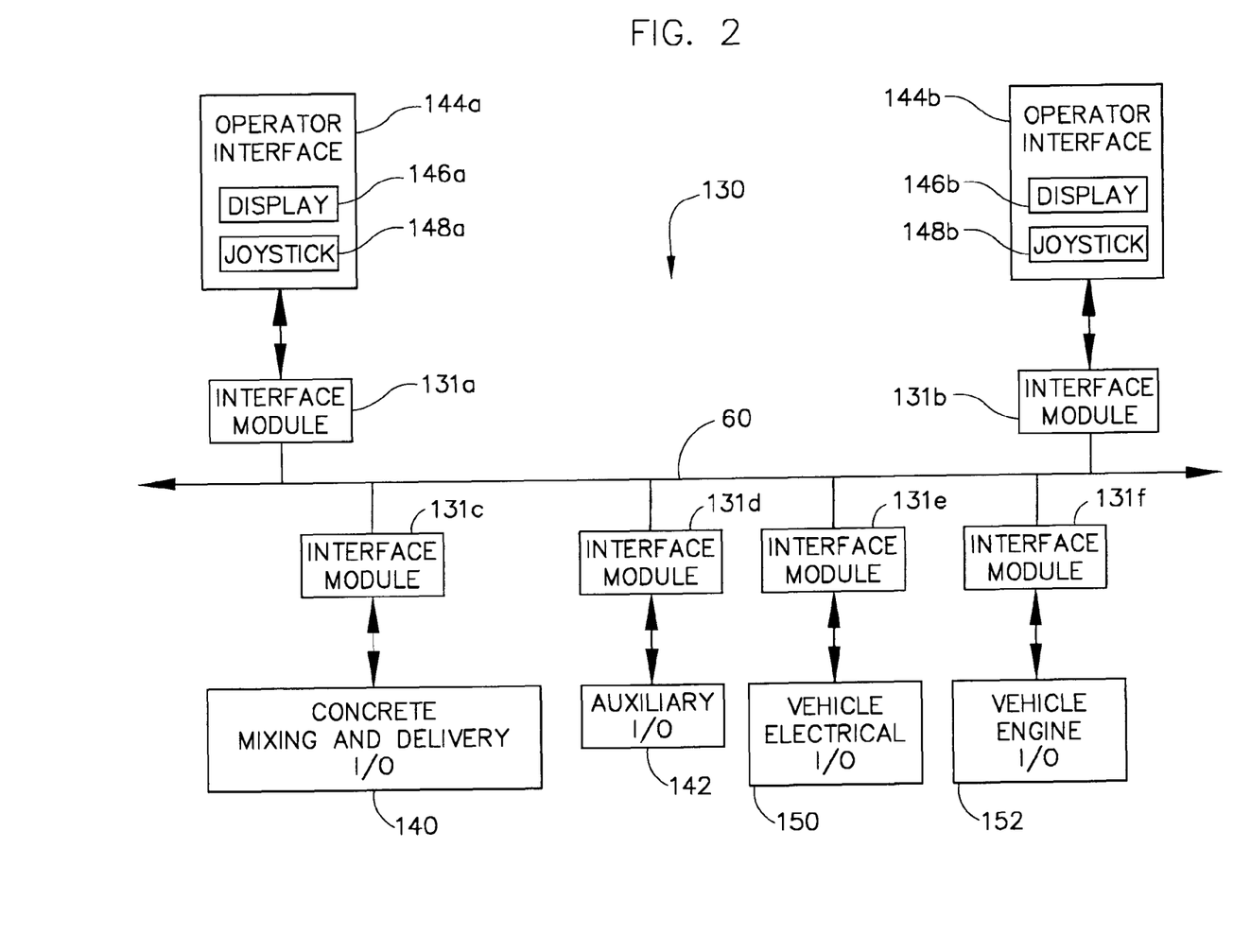
FIG. 2 is a block diagram of a concrete placement vehicle control system according to an exemplary embodiment.
Figure 3:
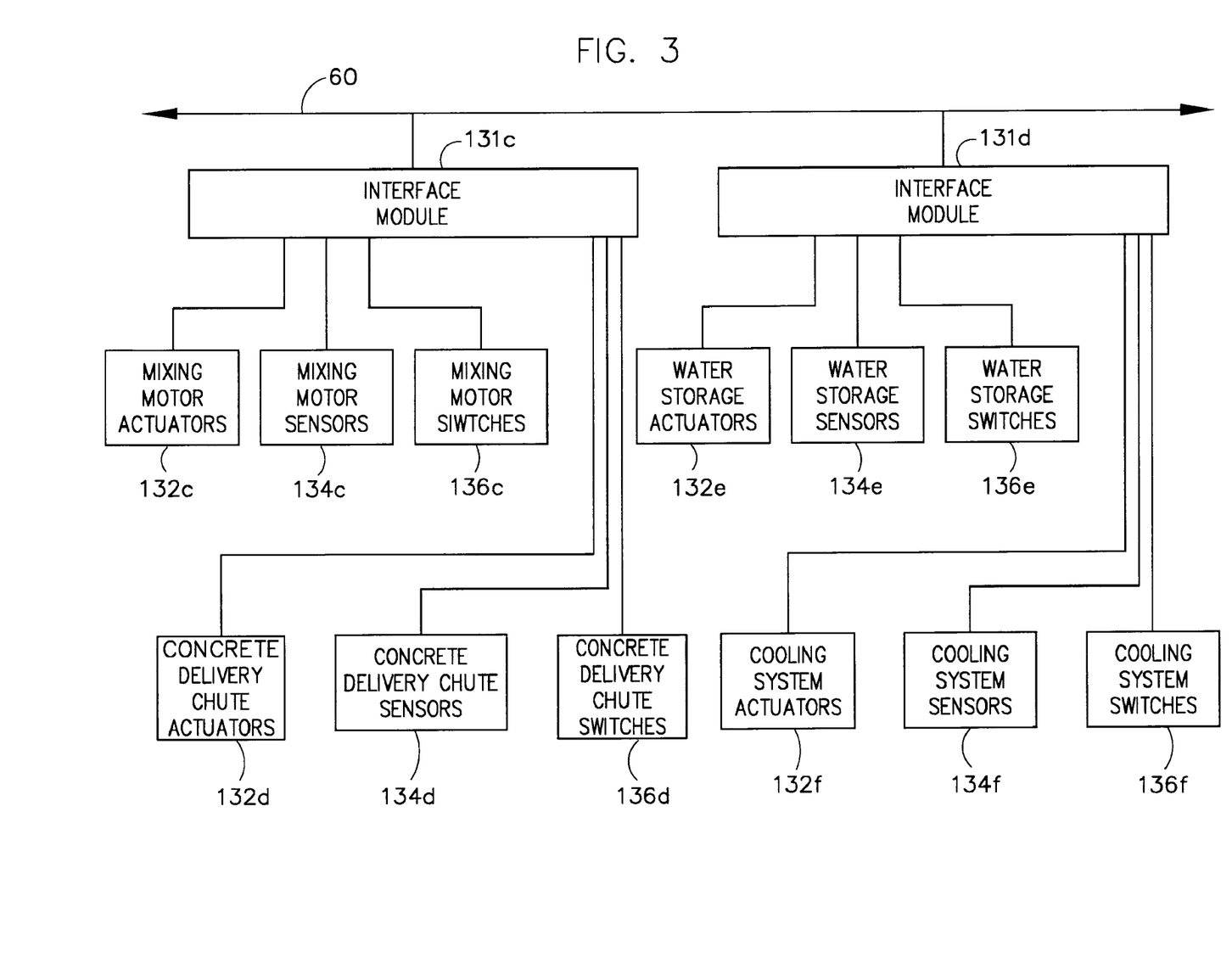
FIG. 3 is a block diagram of a concrete placement vehicle control system capable of controlling the identified components of a concrete placement vehicle according to an exemplary embodiment.

Referring to FIGS. 2 and 3, a concrete placement vehicle control system 130 is illustrated according to an exemplary embodiment. Referring first to FIG. 2, FIG. 2 is an overview of the preferred control system 130 for controlling the concrete placement vehicle 10 and/or its various components such as concrete mixing motor 114 or concrete delivery system 120. The control system 130 includes a plurality of interface modules 131a-131f (collectively, "the interface modules 131"), concrete mixing and delivery I/O devices 140 and 142, and other vehicle I/O devices 150 and 152 and one or more operator interfaces 144a and 144b (collectively, "the operator interfaces 144").

The control system 130 may be implemented in a variety of ways. In a preferred embodiment, control system 130 controls all or a large majority of the operations and components of the concrete placement vehicle. Separate engine, transmission, brake and tire inflation control systems may be provided, however, such control systems are preferably coupled to the control system 130 by way of an additional communication network. The control system 130 may also control other equipment on the concrete placement vehicle 10 such as a water storage system or a cooling system. In an alternative embodiment, control system 130 may be implemented to control only one aspect of the concrete placement vehicle 10 such as the concrete delivery system 120. Control system 130 may also comprise multiple smaller control systems that are interconnected or separate. In an exemplary embodiment, control system 130 is an electronic control system that is microprocessor based.

The operator interfaces 144a and 144b each include a display 146a and 146b respectively (collectively, "the displays 146") and input devices 148a and 148b (collectively, "the input devices 148"). Operator interfaces 144 may be used to receive input from an operator and provide access to functions and/or information, such as diagnostic or concrete characteristic information. The operator interfaces 144 may be located in a variety of positions around the concrete placement vehicle 10. For example, the operator interface 144a may be located in the operator compartment 16 of the concrete placement vehicle 10 and the other operator interface 144b may be located at another location, such as a rear or side location of the concrete placement vehicle 10. In addition, the concrete placement vehicle 10 may be configured with more or fewer operator interfaces 144. For example, the concrete placement vehicle 10 may be configured to include an operator interface 144 in an operator compartment 16 and also include an operator interface 144 on each side of the concrete placement vehicle 10. Distributing the operator interfaces 144 in various locations around the concrete placement vehicle 10 allows the operator or operators multiple access points to control the operation of the concrete placement vehicle 10 without requiring the operator to enter the operator compartment 16 each time.

According to an alternative embodiment, an operator interface 144 may be a remote device, such as a remote control or a handheld computing device, such as a personal digital assistant (PDA). The remote device may communicate with concrete placement vehicle 10 using wired or wireless connections. An exemplary wireless connection may include a wireless link using the Bluetooth Network protocol between the handheld computing device and one of the interface modules or control system 130. The remote device may be configured such that the operator is provided the same functionality and information as if positioned with operator compartment 16 and a hardwired link is used.

As discussed in greater detail in connection with FIG. 3, the concrete mixing and delivery I/O devices 140 and 142 include actuators 132c-132f (collectively, "the actuators 132"), sensors 134c-134f (collectively, "the sensors 134"), limit switches 136c-136f (collectively, "the limit switches 136"), and other devices used to control concrete placement vehicle 10 and/or its various components such as concrete mixing motor 114 or concrete delivery system 120. As shown in FIG. 3, the actuators 132, sensors 134, and limit switches 136 may be used to control the systems and components disposed on concrete placement vehicle 10, such as the mixing motor 114, the concrete delivery chute 122, the water storage system 116, and the cooling system 118. It should be understood that other aspects of the concrete placement vehicle 10 (e.g. vehicle lighting, etc.) may be controlled in addition to those shown in FIG. 2, for example through other vehicle I/O devices 150 and 152.

With regard to the mixing motor 114, in a preferred embodiment, a rotation speed sensor 134c may measure the rotation speed on concrete mixing drum 112. Also, a limit switch 136c or sensor 134c may be used to ascertain whether mixing motor 114 is at or near a defined overheat point such as, for example, when concrete drum 112 is filled with a load of concrete having low-slump characteristics. In another embodiment, a sensor 134c may be used to determine the rotation speed of concrete mixing drum 112 through mixing motor 114 to determine whether the rotation speed is desirable based on a characteristic associated with the concrete load. For example, if the concrete load is a low-slump load, it may be desirable to maintain a fairly high drum rotation speed to prevent the concrete load from setting prematurely.

With regard to the concrete delivery chute 122, in a preferred embodiment, a position sensor 134d measures rotation of concrete delivery chute 122 along the semicircular arc. Also, a limit switch 136d or position sensor 134d may be used to ascertain whether the concrete delivery chute 122 is at or near its mechanical stops such as, for example, when a hydraulic cylinder reaches its end points.

With regard to the water storage system 116, in a preferred embodiment, a sensor 134e or limit switch 136e may be used to determine the amount of water available for delivery. Likewise, a limit switch 136f or sensor 134f may be used to ascertain the cooling status of the cooling system 118. The status or level information can then be fed to interface modules 131e and 131f respectively where the information is broadcast to the other interface modules 131 in the concrete placement control system 130.

Advantageously, coupling the interface modules 131 through the communication network 60 allows each interface module to communicate with the other interface module, such that an interface module may determine an operational state of any component associated the concrete placement vehicle 10 that is coupled to communication network 60. Further, communication network 60 may be coupled to external networks such as a wireless network to communicate information related to concrete placement vehicle 10 to an external computing device. Accordingly, an operator standing outside operator may check information and control systems on vehicle 10 from outside operator compartment 16. Further, the information may be communicated to a remote computing system for location, maintenance, productivity, and emergency tracking.

The interface modules 131 are preferably locally disposed with respect to the respective input and output devices to which each interface module is coupled so as to permit distributed data collection from the plurality of input devices and distributed power distribution to the plurality of output devices. Of course, each of the interface modules 131 may, in addition, be coupled to other non-local input devices and output devices. Further, the control system 130 can also include input devices and output devices which are not connected to the interface modules 131.

As shown in FIG. 3, the sensors 134c-134f and the limit switches 136c-136f are connected as input devices to the interface modules 131c and 131d. The interface modules 131c and 131d thereby receive the sensor information pertaining to concrete mixing motor 114, delivery system 120, water storage system 116, and cooling system 118. The actuators 132c-132f are connected as output devices to the interface modules 131c and 131d. The interface modules 131c and 131d provide the actuators 132 with control signals to change rotation speed for the concrete mixing motor 114, adjust output from the concrete delivery system 120, adjust output from water storage system 116, and adjusting the cooling level provided by cooling system 118. The actuators 132, the sensors 134, and the limit switches 136 collectively correspond to the "concrete mixing and delivery I/O devices" which are labeled with the reference numbers 140 and 142 in FIG. 2. Other I/O devices may also be used. The interface modules 131c and 131d may be located near or on the concrete mixing motor 114, concrete delivery system 120, water storage system 116, or cooling system 118 of the concrete placement vehicle 10, or, alternatively, the interface modules 131c and 131d may be located anywhere on the concrete placement vehicle 10, for example, near where the mixing motor 114 connects to the concrete placement vehicle 10.

The sensors 134 may be encoders, resolvers, potentiometers or other suitable measuring devices. The actuators 132 may be electrically or hydraulically driven acuators that control the flow of power to the concrete placement vehicle 10 and individually to the concrete mixing motor 114, concrete delivery system 120, water storage system 116, or cooling system 118. Alternatively, the actuators may be an electric motor. Other arrangements could also be used.

The input devices 148 may be switches, knobs, dials, joysticks, etc. According to an exemplary embodiment, at least some of input devices 148 are multi-axis joysticks, with the control system 130 being capable of receiving operator inputs from either input device 148a, 148b and using the operator inputs to control the various components of the concrete placement vehicle 10. Preferably, the input devices 148 can selectively control the concrete delivery system 120. However, it should be understood that the input devices 148 may also be configured to control the concrete mixing and its various components such as the concrete mixing motor 114, the water storage system 116, etc.

The input devices 148 may be configured to control the concrete delivery system 120 as follows. For example, the input devices 148 may be two-axis joysticks, with left to right corresponding to rotation of delivery chute 122 along the semicircular arc and forward and back corresponding to raising and lowering the delivery chute 122. Alternatively, input device 148 may include a potentiometer such that rotation of input device 148 will correlate with rotation of delivery chute 122. Additionally, input device 148 may include two push buttons, correlating to charging and discharging where each depression of a pushbutton corresponds to increasing and/or decreasing the flow of concrete from mixing drum 112. Additional or alternative operator input devices may be used depending on what type of operator input is desired.

Because the input devices 148 are coupled to the actuators 132 through a concrete placement vehicle controller 160, the concrete placement vehicle controller 160 is a controller configured to process the operator inputs from the input devices 148 to provide user-friendly control of the actuators 132. For example, the concrete placement vehicle controller 160 may be programmed to increase the speed of movement of delivery chute 122 as the operator maintains a particular joystick position. For example, if the operator holds the joystick 148*a* or 148*b* in the left position, the speed of lateral movement of the delivery chute 122 may be programmed to increase the longer the joystick-left position is maintained.

Figure 4:
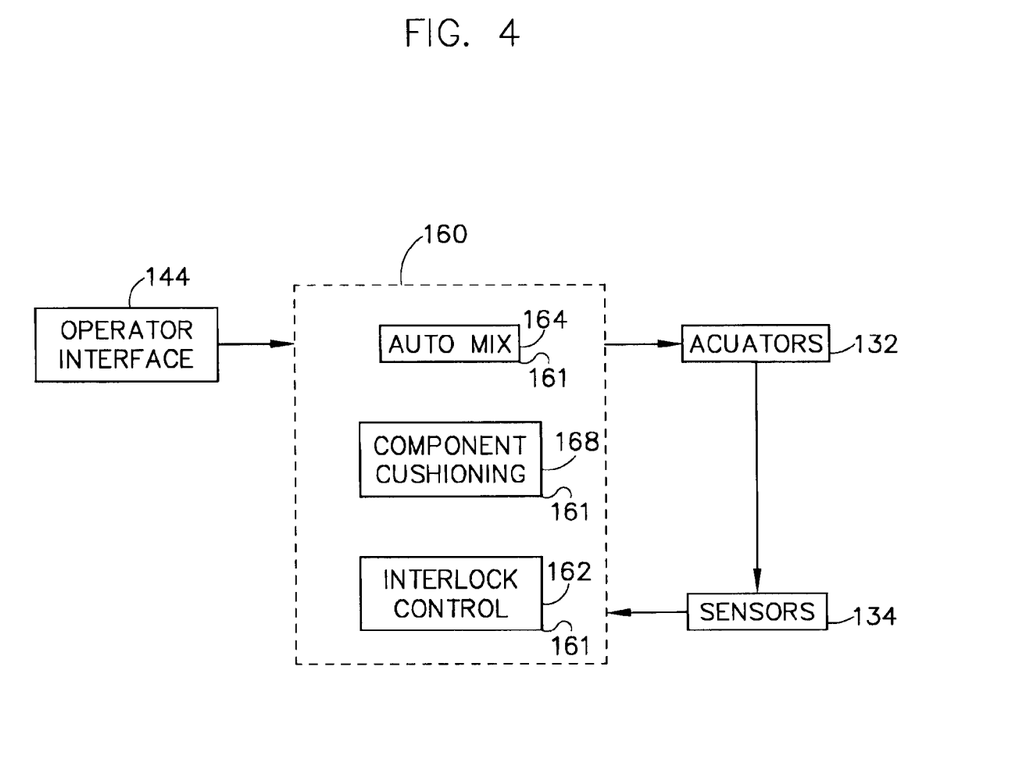
FIG. 4 is a block diagram showing selected aspects of the control system of FIG. 3 in greater detail according to an exemplary embodiment.

Referring now to FIG. 4, the arrangement of FIGS. 2 and 3 can be used to implement a variety of advantageous features or operations, such as an auto mix operation, a component cushioning feature, interlock control, and other features. FIG. 4 is a functional block diagram of a vehicle controller 160 that implements such features. Also shown are the operator interface 144, a concrete placement vehicle controller 160, the actuators 132, the sensors 134, and a plurality of other input devices.

Vehicle controller 160 may be implemented using a stand-alone controller or using one or more interface modules. In the embodiment described herein, the vehicle controller 160 is implemented using the interface modules 131*c*-131*f* of FIGS. 2 and 3. According to this arrangement, all of the interface modules 131 are preferably identically programmed, and the interface modules 131 each include control programs which implement a plurality of control modules 161 including an auto mix module 164, interlock control module 162, and component cushioning module 168. In one example, the interface module 131*c* receives I/O status information from other interface modules 131 through I/O status broadcasts, and maintains an I/O status table based on the I/O status broadcasts and based on locally acquired/determined I/O status information. The interface module 131*c* then controls the actuators 132*c* by executing those portions of the control programs pertinent to the actuators 132*c* and using the I/O status information stored in its I/O status table. The interface module 131*d* operates in the same manner, except that it controls the actuators 132*d* by executing those portions of the control programs pertinent to the actuators 132*d*. The interface modules 131*a* and 131*b* are not shown in FIG. 4, although it is to be understood that the input information from the operator interfaces 144 is received by the interface modules 131*a* and 131*b* and transmitted from the interface modules 131*a* and 131*b* to the interface modules 131*c*-131*f* in the form of an I/O status broadcast over the communication network 60. This configuration is preferred where the control system 130 is part of a larger control system that controls all or a large majority of the operations and components of the concrete placement vehicle, as previously described.

If the control system 130 is dedicated to concrete delivery control, then preferably alternative configurations are employed. For example, the vehicle controller 160 may instead be implemented using a single electronic control unit, as previously indicated.

The auto mix module 164, interlock control module 162, component cushioning module 168, and other operations and features will now be described in greater detail. As previously noted, the modules 162, 164, and 168 are preferably implemented as part of the control logic programmed into the interface modules 131*a* and 131*b*.

1. Auto Mix

As shown in FIG. 4, the concrete placement vehicle controller 160 has an auto mix module 164 that assists the operator in mixing and maintaining a load of concrete. The vehicle controller 160 assists the human operator in performing various operations that are part of mixing a concrete load. The vehicle controller 160 is capable of repeatedly performing any operation with a degree of precision that a human operator is unable to achieve. Further, the vehicle controller 160 is capable of continuously monitoring a concrete load allowing an operator to focus on other tasks such as driving vehicle 10 or placing concrete.

As explained above, the concrete placement vehicle 10 can be configured to monitor and maintain at least one characteristic of a concrete load independent of operator intervention. In a preferred embodiment, the operator inputs concrete load characteristic information into the vehicle controller 160 using one of the operator interfaces 144 shown in FIG. 4. The concrete load characteristic information corresponds to at least one characteristic of a concrete load, such as desired slump, moisture content, etc. The concrete load characteristic information is then used by the vehicle controller 160 to perform at least one operation in relation to the concrete load characteristic. Exemplary types of operations are discussed further in the following paragraphs. The concrete load characteristic information may be entered in a number of ways and is not to be limited to being entered by the operator. For example, the concrete load characteristic information may be entered by the concrete load producer, a person at the delivery site, or in some other manner.

As shown in FIG. 4, operator inputs are received from one of the operator interfaces 144 and transmitted by the appropriate interface modules 131*a* or 131*b* in the form of I/O status broadcasts to all of the interface modules including the interface modules 131*c* and 131*d*, which form the concrete placement vehicle controller 160. The interface modules 131*a* and 131*b* acquire the operator inputs and processes (e.g. scales, amplifies, power conditions, etc.) the inputs to provide to vehicle controller 160 to generate control signals to control concrete mixing system 111. The operator inputs are provided to the interlock control module 162 (the above-mentioned processing may be performed before and/or after the operator inputs are provided to the interlock control module 162). According to an additional embodiment, inputs can be received from both a module and an operator interface where the module is configured to facilitate the operator interface. For example, the module can provide feedback through the operator interface when an interlock is engaged, as described further below.

One of the operations in which the auto mix module 164 can assist the human operator is by maintaining a concrete moisture content. By maintaining a moisture content of a concrete load during transportation of the concrete load to a delivery site, the operator is able to deliver the concrete load immediately upon arrival. Further, maintaining a concrete moisture content during delivery from mixing drum 112 ensures that the concrete load remains uniform during delivery.

Figure 5:
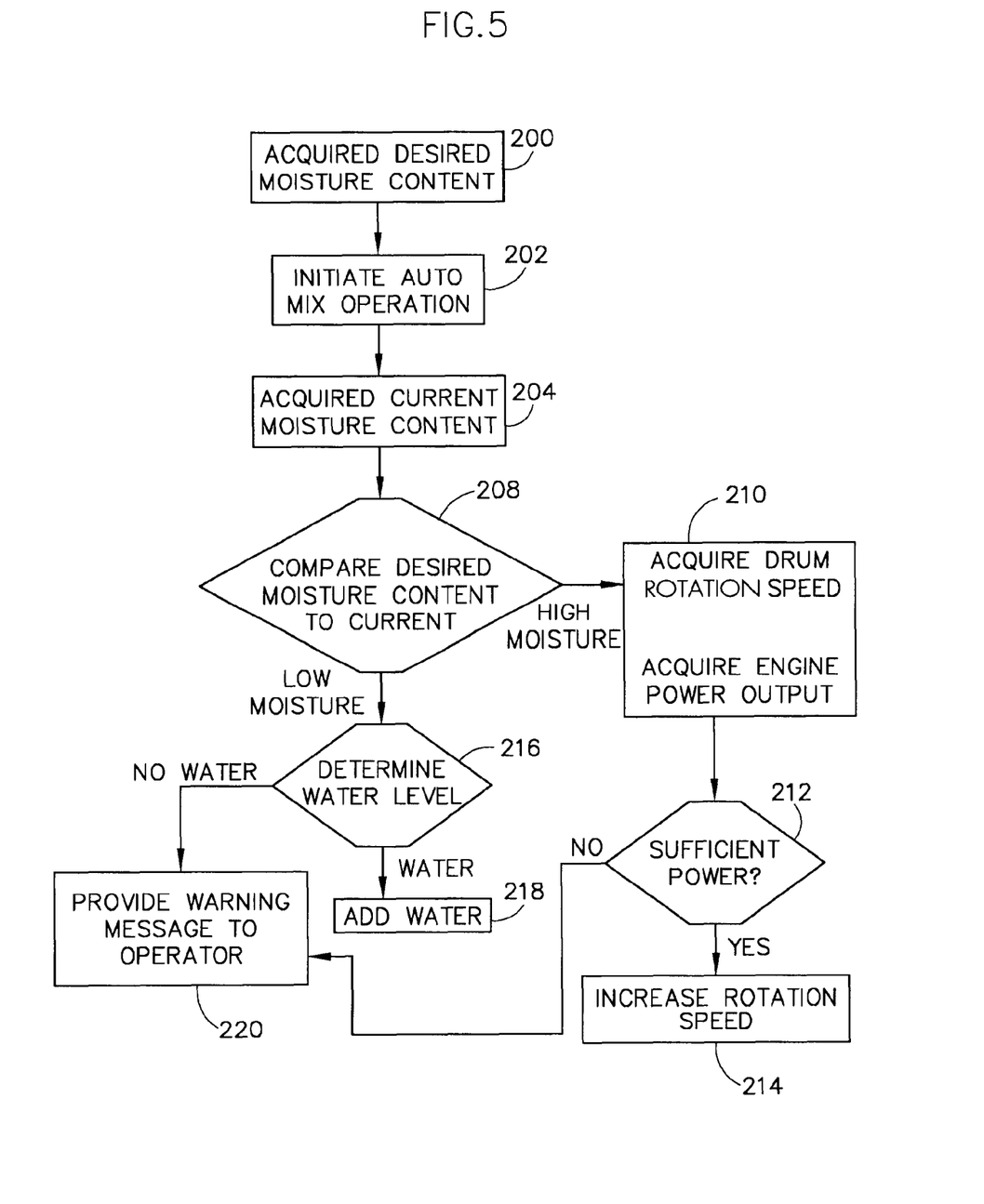
FIG. 5 is a flowchart showing a method for automatically mixing concrete according to an exemplary embodiment.

Maintaining a moisture content of a concrete load can be accomplished in a number of ways. One exemplary embodiment is depicted in FIG. 5. At step 200, the operator initially inputs a desired moisture content. Alternatively, this desired moisture content may be retrieved from a memory of the controller 160, selected from a displayed listing, received from an operator at a delivery site, etc. In addition, to entering desired moisture content input, the operator may alternatively enter other input such as a desired slump factor for the concrete load.

After the desired moisture content is entered or retrieved from memory, the operator can then initiate the auto mix operation as shown at step 202. Preferably, this is done by simply pushing a single button on an operator input device or some other equivalent single input on the part of the operator. However, other ways of initiating the auto mix sequence are within the scope of the disclosed control system.

At step 204, the moisture content of the concrete load is acquired. The moisture content of the concrete load can be obtained by measuring the moisture content of the concrete load using a sensor 134 disposed within mixing drum 112.

At step 208, the moisture content of the concrete load is compared to the desired moisture content input by the operator. If the current moisture content is below the desired moisture content then the concrete load is no longer maintained according to the desired moisture content, and the process proceeds to step 216. However, if the current moisture content is above the desired moisture content then the process moves from step 208 to step 210.

At step 210, the rotation speed of the mixing drum 112 by the mixing motor 114 and the current engine speed are acquired. A determination is made in a step 212 whether the engine speed of concrete placement vehicle 10 is sufficiently high to allow mixing motor 114 to increase the rotation speed for mixing drum 112. If sufficient power is available the drum rotation speed can be increased in a step 214. Increasing the rotation speed of mixing drum 112 increases the rate of drying of the concrete load to reduce the moisture content of the concrete load. If sufficient power is not available, a warning indication can be transmitted to the operator at step 220.

If the moisture content is lower than the desired moisture content, water can be automatically added from water storage system 116 to raise the moisture content of the concrete load to the desired moisture content. In a step 216, a controller can determine the current water level in water storage system 116. If there is sufficient water in the water storage, the controller can control an acuator to begin pumping water from the water storage system 116 to the mixing drum 112 to raise the moisture content of the concrete load therein in a step 218. Additionally, the controller can increase or decrease the rotation speed imparted by mixing motor 114 to optimize the integration of the new moisture into the concrete load. If there is insufficient water in water storage system 116, a warning indication can be transmitted to the operator at step 220.

According to an alternative embodiment, auto mix module 164 may be used to implement a timed or count based mixing procedure. An average concrete load can be adequately mixed using approximately 70 rotation of concrete mixing drum 112. Accordingly, auto mix module 164 may be configured to receive a "mix" input instruction from an operator and initiate a process to rotate mixing drum 112 seventy (70) times. The auto mix module 164 may further be configured to vary the rotation speed during the 70 rotations, for examples turning slowly initially do avoid raising concrete dust prior to saturation of the concrete materials with the water.

While FIGS. 4 and 5 generally disclose using a feedback control loop to maintain the moisture content of a concrete load, other feedback loops may be implemented with control system 130. For example, a feedback loop may be implemented to facilitate delivery of a concrete load from mixing drum 112 to a delivery point. Another feedback loop may be implemented to "creep" the vehicle 10 while discharging. Further, although steps are described sequentially with reference to FIG. 5, the method can include additional or fewer steps and the steps can be performed in any order.

2. Interlock Control

Referring back to FIG. 4, the concrete placement vehicle controller 160 has an interlock control module 162 that assists the operator by preventing potentially harmful actions from being executed. Examples of some of the many operations performed by the interlock control module 162 are given below.

One example of the operation of the interlock control module 162 occurs when an operator inputs a desired mixing drum rotation speed that is greater than the drum rotation speed that can be provided based on the power output by the engine of vehicle 10. In a preferred embodiment, the control system 130 displays an error message on the operator interface 144 informing the operator of the problem. In another instance, the control system 130 can be configured to increase the speed for the engine for the concrete placement vehicle 10. In still another instance, the control system 130 can be configured to increase the drum rotation speed to the rotation speed up to what can be provided based upon the speed for the engine for the concrete placement vehicle 10.

Another example of the operation of the interlock control module 162 occurs when an operator delivers concrete from mixing drum 112. For example, it may be desirable to survey a plurality of additional systems to ensure that safety and operational effectiveness have been maximized. For example, it may not be desirable to allow the mixing drum 112 to discharge the concrete load while the delivery chute 122 is not fully engaged. Another example may include ensuring that the characteristics of the concrete load to be discharged satisfy previously entered characteristics to ensure that a non-conforming concrete load is not delivered. Yet another example may include halting rotation of mixing drum 112 when it is determined that a concrete load has been fully discharged.

A further example of the operation of the interlock control module 162 occurs when components or systems associated with the concrete placement vehicle 10 become overheated and need to be cooled. Sensors associated with the overheating system or component that is overheating may detect the condition and activate the cooling system 118 to begin cooling the system or component. Further, cooling system 118 may receive the overheat information from the system or component to determine whether the system or component may be cooled while still active based on available cooling capacity, or whether the component should be disengaged.

The interlock control module 162 can also be used to prevent other potentially harmful component interactions. For example, it may be desirable to prevent driving of the concrete placement vehicle 10 while delivery chute 122 is extended. In other instances, it may be desirable to allow driving of vehicle 10 while concrete delivery chute 122 is extended, for example to allow vehicle 10 to creep along while delivering the concrete to spread the concrete, but limit the top driving speed to a maximum value such as five miles per hour.

3. Component Cushioning

Referring back to FIG. 4, the concrete placement vehicle controller 160 has a component cushioning module 168 that assists the operator by preventing the components of the concrete placement vehicle 10 from reaching their mechanical stop points. Typical mechanical stop points include points where a hydraulic cylinder reaches its physical limits or where components physically meet each other or remaining portions of concrete placement vehicle 10.

The component cushioning module 168 constantly monitors the position of various components and ensures that they do not meet their mechanical stop points. For example, during delivery of a concrete load, the component cushioning module 168 is given the position of the concrete delivery system 120 and its components, namely, the concrete delivery chute 122. If the operator has input a position to maneuver the delivery chute 122 that is too close to the mechanical stops for the delivery chute 122, for example, then the component cushioning module 168 will adjust the operator's input accordingly to keep it a specified distance from the mechanical stops. The distance may be set by the operator as an input or may be set by the manufacturer. One exemplary distance is 4 inches from the mechanical stops of a component. However, other distances, such as between 2 and 5 inches will work as well.

As previously noted, the construction and arrangement of the various aspects of vehicle 10 and the control system 130 shown in the preferred and other exemplary embodiments are illustrative only. The components disclosed in the figures are shown only by way of example and should not be construed to limit the applicability of the present disclosure to controlling only those components. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions as expressed in the appended claims.

What is claimed is:

1. A concrete placement system, comprising:
    a plurality of components for mixing and placing concrete including at least a first component and a second component;
    the first component configured to operate in a first operational state;
    the second component configured to operate in a second operational state; and
    a control system configured to determine the first operational state of the first component based on an input received from a first sensor, to determine the second operational state of the second component based on an input received from a second sensor, and to control the first component based on the second operational state of the second component.

2. The concrete placement system of claim 1, wherein the first operational state and the second operational state comprise at least one of operating, waiting, stopped, and failed.

3. The concrete placement system of claim 1, wherein controlling the first component includes controlling an engine speed of a concrete placement vehicle upon which the concrete placement system is mounted.

4. The concrete placement system of claim 3, wherein the engine speed of the concrete placement vehicle is controlled based upon a rotation speed of a concrete mixing drum.

5. The concrete placement system of claim 1, wherein controlling the first component includes preventing operation of the first component.

6. The concrete placement system of claim 1, wherein controlling the first component includes controlling operation of a concrete delivery system including a motor driven concrete delivery chute.

7. The concrete placement system of claim 6, wherein the operation of the concrete delivery system includes rotation and elevation control of the motor driven concrete delivery chute.

8. The concrete placement system of claim 7, wherein the rotation and elevation control of the motor driven concrete delivery chute includes slowing a rotation or elevation speed as the motor driven concrete delivery chute nears a mechanical stopping point.

9. The concrete placement system of claim 6, wherein controlling the operation of the concrete delivery system includes controlling the operation of the concrete delivery system based on an operational state of the motor driven concrete delivery chute.

10. The concrete placement system of claim 1, wherein the first operational state and the second operational state comprise at least one of stored, extended, stopped and moving.

11. The concrete placement system of claim 1, wherein the control system is configured to send and receive information to and from a remote input device;
    wherein the remote input device communicates with the control system using a wireless communication link.

12. The concrete placement system of claim 1, wherein the control system is configured to send and receive information to and from the remote input device;
    wherein the information is control information to control operation of the concrete placement vehicle;
    wherein the remote input device is a personal digital assistant.

13. A concrete placement system, comprising:
    a plurality of components for mixing and placing concrete including at least a first component and a second component;
    the first component configured to operate in a first operational state;
    the second component configured to operate in a second operational state; and
    a control system configured to determine the first operational state of the first component based on an input received from a first sensor, to determine the second operational state of the second component based on an input received from a second sensor, and to control the first component based on the second operational state of the second component;
    wherein controlling the first component includes preventing operation of the first component.

* * * * *